United States Patent [19]
Lee

[11] Patent Number: 5,099,379
[45] Date of Patent: Mar. 24, 1992

[54] SURGE PREVENTING CIRCUIT FOR ELECTROMAGNETIC INDUCTION COOKING APPARATUS

[75] Inventor: Jae C. Lee, Seoul, Rep. of Korea
[73] Assignee: Gold Star Co., Ltd., Rep. of Korea
[21] Appl. No.: 736,035
[22] Filed: Jul. 25, 1991
[30] Foreign Application Priority Data
   Jul. 31, 1990 [KR] Rep. of Korea ............... 11731/1990
[51] Int. Cl.$^5$ ............................................. H02H 7/10
[52] U.S. Cl. ......................................... 361/18; 361/91; 361/103; 219/10.55 B
[58] Field of Search ...................... 361/18, 98, 78, 103, 361/86, 91; 219/10.55 B, 449, 488, 494, 497; 323/908; 363/49

[56] References Cited
U.S. PATENT DOCUMENTS
4,233,557 11/1980 Alberkrack ............................ 363/49
4,752,892 6/1988 Ahl et al. ............................. 361/58

Primary Examiner—Todd E. Deboer
Attorney, Agent, or Firm—Ostrolenk, Faber, Gerb & Soffen

[57] ABSTRACT

A surge preventing circuit for an electromagnetic induction cooker comprising a heating plate temperature sensor, an upper plate temperature sensor, a collector voltage limiting circuit, an abnormal condition sensor, a gate circuit, a minimum turn-on time setting unit, and a minimum turn-on time output controller.

The surge preventing operation is carried out by applying a detection signal to a microcomputer when the temperature of the heating plate and the upper plate rises excessively or when the collector voltage of the power transistor is greater than a rated value and cutting off an output voltage of an integrator to be applied to a charge/discharge unit, an then when the output voltage of the charge/discharge unit is lower than a rated value, cutting off the driving of an inverter circuit, thereby preventing a large surge voltage from generating at the inverter circuit.

4 Claims, 2 Drawing Sheets

SURGE PREVENTING CIRCUIT FOR ELECTROMAGNETIC INDUCTION COOKING APPARATUS

BACKGROUND OF THE INVENTION

The present invention relates to a circuit for preventing a surge from occurring for use in an electromagnetic induction cooking apparatus, and more particularly to a surge preventing circuit for an electromagnetic induction cooking apparatus which detects an overheating of a heating plate or an upper plate disposed within the electromagnetic induction cooking apparatus or an overheating of a collector voltage of a power transistor and then cuts off its output slowly not abruptly, thereby preventing the breakdown of circuit components which may occur by virtue of a generation of a great surge.

A conventional control circuit for an electromagnetic induction cooking apparatus is shown in FIG. 1.

The conventional control apparatus comprises a low-pass filter 1 for passing only a low-band component of an alternate current (AC) power therethrough, a full-wave rectifying unit 2 for full-wave rectifying an output power of the low-pass filter 1, an inverter circuit unit 3, consisting of a working coil, resonance capacitors and a power transistor, for receiving an output power of the full-wave rectifying unit 2 as an operating power to heat a magnetic vessel, an input current sensing unit 4 for sensing an input current of the low-pass filter 1, a power supply 5 for producing direct current sources $V_{CC1}$ and $V_{CC2}$, and a direct current source $V_{CC3}$ of an output control circuit by receiving the alternate current (AC), which are used to turn on or off the power transistors of the inverter circuit 3, a temperature sensing unit 6 for cutting off the input power source of the full-wave rectifying unit 2 by detecting an overheating of a heating plate which is resulted from the overheating of a full-wave rectification diode of the full-wave rectifying unit 2 and the power transistor of the inverter circuit unit 3, a microcomputer 7 for controlling the whole system and for outputting output control signals in response to the user's selection, an output converting unit 8 for converting the output control signal of the microcomputer 7 into an analog signal, an operational comparator $OP_1$ for comparing the output signal of the output converting unit 8 with the output signal of the input current sensing unit 4, a vessel sensing unit 9 for determining whether a magnetic vessel, which is suitable to be heated, is laid on the upper plate by checking the output signal of the input current sensing unit 4, a condition sensing unit 10 for applying a vessel present-/absent discrimination signal to the microcomputer 7 in response to the output signal of the vessel sensing unit 9, an integrator 11 for integrating the output signal of the operational comparator $OP_1$, a negative feedback operating unit 12 for varying the output of the integrator 11 in response to the output of the vessel sensing unit 9, a charge/discharge unit 13 for charging the output voltage of the integrator 11, a search signal circuit 14 for converting the control signal outputted from the microcomputer 7 into a signal for driving the inverter circuit 3 and applying the converted signal to the charge/discharge unit 13 in order to discriminate the presence/absence of a vessel, an operational comparator $OP_2$ for buffering and amplifying the output voltage of the charge/discharge unit 13 and outputting the amplified signal, a minimum turn-on time setting unit 15 for detecting the output voltage of the charge/discharge unit 13 when the output voltage is lower than a set value, a collector voltage limiting circuit 16 for detecting the collector voltage of the power transistor of the inverter circuit 3 when the collector voltage is greater than a rated value by the power transistor being turned on more than a predetermined time due to an abnormal operation, an upper plate temperature sensing unit 17 for detecting an overheating of the upper plate when the temperature of the upper plate rises over a set value, a NOR gate $NOR_1$ for NORing the detection signals of the collector voltage limiting circuit 16 and the upper plate temperature sensing unit 17 and applying the NORed signals to an output terminal of the operational comparator $OP_2$, a synchronizing circuit 18 for outputting a time point decision signal for turning on or off the power transistor of the inverter circuit 3, an operational comparator $OP_3$ for comparing the output signal of the second operational comparator $OP_2$ with the output signal of the synchronizing circuit 18, and a power transistor driving unit 19 for outputting a driving signal for turning on or off the power transistor of the inverter circuit 3 in response to the output signal of the third operational comparator $OP_3$.

In such a conventional apparatus, when the temperature of the heating plate is abnormally high, the temperature sensing unit 6 detects such an abnormal condition and cuts off the input power of the full-wave rectifying unit 2 so that an excess inverse electromotive force is produced at the inverter circuit 3, thereby causing the power transistor to be broken down. In addition, there has been another disadvantage in that when the collector voltage of the power transistor of the inverter circuit 3 rises more than a set value, the collector voltage limiting circuit 16 detects the condition and outputs a high level detection signal, and when the temperature of the upper plate rises more than a set value, the upper plate temperature sensing unit 17 detects the condition and then outputs a high level detection signal, and also when the output voltage of the charge/discharge unit 13 becomes lower than a set value, the minimum turn-on time setting unit 15 detects the condition and then outputs a high level detection signal, and thus when any one of the minimum turn-on time setting unit 15, the collector voltage limiting circuit 16 and the upper plate temperature sensing unit 17 outputs a high level detection signal, the NOR gate $NOR_1$ outputs a low level signal, causing the output signal of the second operational comparator $OP_2$ to be a low level signal and thus a low level signal is outputted from the third operational comparator $OP_3$, thereby the transistor driving unit 19 stops instantaneously the driving of the inverter circuit 3 so that a surge voltage is produced at the inverter circuit 3 which may cause the breakdown of the circuit components such as the power transistor and the like.

SUMMARY OF THE INVENTION

It is, therefore, an object of the present invention to provide a surge preventing circuit for an electromagnetic induction cooking apparatus which can prevent the generation of an excess inverse electromotive force and a surge voltage by interrupting slowly the driving of the inverter circuit in case that the temperature of the heating plate and the upper plate disposed within the electromagnetic induction cooking apparatus rises excessively and when the collector voltage of the power transistor rises excessively.

The object of the present invention is obtained by providing a circuit comprising a heating plate temperature sensing unit, an upper plate temperature sensing unit, a collector voltage limiting circuit for detecting a collector voltage of a power transistor of an inverter circuit when the collector voltage is greater than a rated value, an abnormal condition detecting unit for detecting the abnormal condition when a detection signal is outputted from any one of said temperature sensing unit, said upper plate temperature sensing unit or said collector voltage limiting circuit, a gate circuit for cutting off the input of an output voltage of an integrator to a charge/discharge unit in response to an output control signal of a microcomputer when an abnormal condition is detected by said abnormal condition detecting unit and for applying the abnormal condition detection signal to the microcomputer, a minimum turn-on time setting unit for detecting the output voltage of the charge/discharge unit when the output voltage is lower than a set value, and a minimum turn-on time output control unit for cutting off the output voltage of the charge/discharge unit to be inputted via an operational comparator to the power transistor as a driving control voltage by the detection signal of the minimum turn-on time setting unit.

The circuit of the present invention is operated such a manner that when the temperature of the heating plate and the upper plate rises excessively or when the collector voltage of the power transistor is greater than a rated value, such a condition is detected and the detection signal is applied to a microcomputer so that a relevant control is carried out, and at the same time an output voltage of an integrator, which is a driving control voltage, is cutoff to be applied to a charge/discharge unit by the detection signal, and thus as the output voltage of the charge/discharge unit is discharged slowly the driving of the inverter circuit is decreased slowly and when the output voltage of the charge/discharge unit is lower than the set value of the minimum turn-on time setting unit, the driving of the inverter circuit is cutoff.

BRIEF DESCRIPTION OF THE DRAWINGS

The above and other objects, features and advantages of the present invention will become apparent from the following detailed description taken in conjunction with the accompanying drawings, wherein.

DETAILED DESCRIPTION OF THE INVENTION

Figure 1:
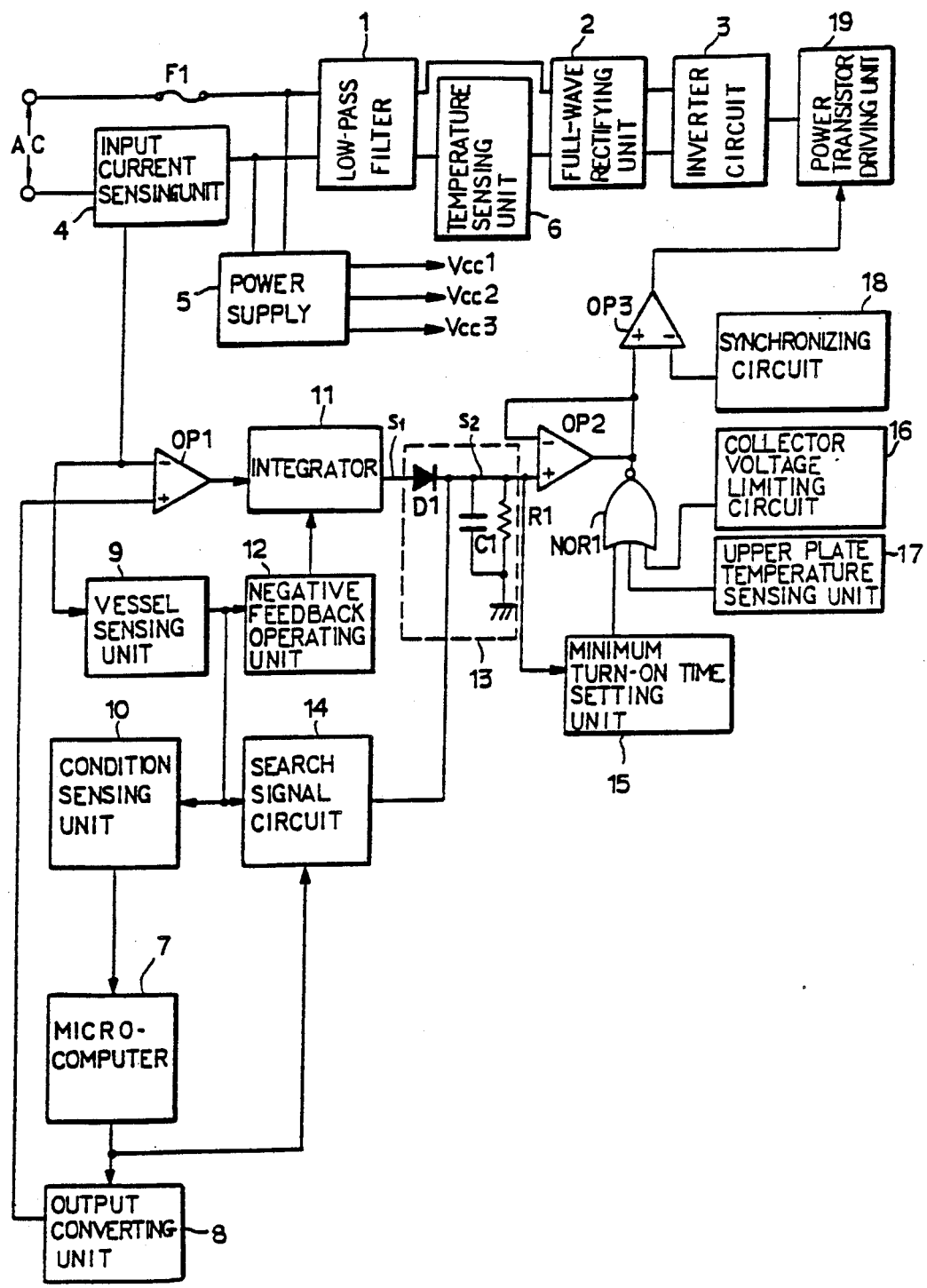
FIG. 1 is a diagram showing a control circuit of a conventional electromagnetic induction cooking apparatus.
Figure 2:
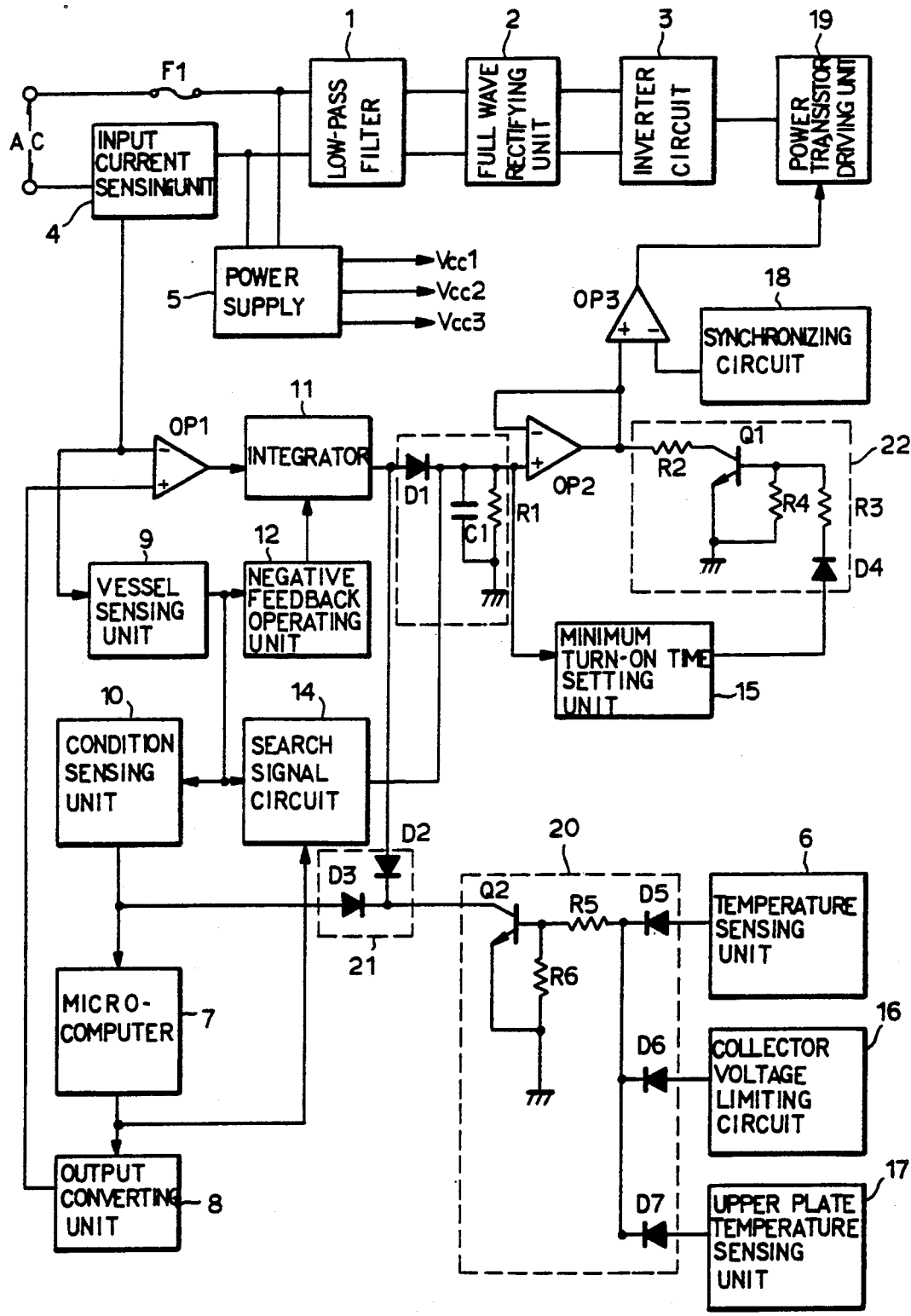
FIG. 2 is a diagram showing a surge preventing circuit of an electromagnetic induction cooking apparatus according to the present invention.

Referring to FIG. 2, wherein the parts denoted by same reference numerals as those in FIG. 1 are same circuit sections and hereinafter, the parts different from those in FIG. 1 will be described.

The circuit for preventing the generation of a surge according to the present invention comprises an abnormal condition sensing unit 20 which is constituted such that an output of a low-pass filter 2 is connected directly to an input of a full-wave rectifying unit 4, and outputs of a temperature sensing unit 6, a collector voltage limiting circuit 16 and an upper plate temperature sensing unit 17 are connected via diodes $D_5$, $D_6$ and $D_7$, respectively, and a resistor $R_5$ to a resistor $R_6$ and a base of a transistor $Q_2$, a gate circuit 21 which is constituted such that a connecting node $S_1$ of an integrator 11 and a charge/discharge unit 13 and a connecting node $S_3$ of the condition sensing unit 10 and a microcomputer 7 are connected via diodes $D_2$ and $D_3$, respectively, to a collector of the transistor $Q_2$, and a minimum turn-on time output control unit 22 which is constituted such that the output of the minimum turn-on time setting unit 15 is connected via a diode $D_4$ and a resistor $R_3$ to a resistor $R_4$ and a base of a transistor $Q_1$, and a collector of the transistor $Q_1$ is connected via a resistor $R_2$ to a connecting node of an output port of an operational comparator $OP_2$ and a non-inverting input port of an operational compartor $OP_3$.

Hereinafter, the operation and effect of the present invention will be described in detail.

When a temperature of the heating plate rises abnormally, the temperature sensing unit 6 detects the abnormal condition and then outputs a high level detection signal. And, when the collector voltage of the power transistor of the inverter circuit 3 is in an excessive condition, the collector voltage limiting circuit 16 detects the condition and then outputs a high level detection signal. Also, when the temperature of the upper plate rises over a set value, the upper plate temperature sensing unit 14 detects the condition and then outputs a high level detection signal.

As above, in case that any one of the temperature sensing unit 6, the collector voltage limiting circuit 16 and the upper plate temperature sensing unit 17 outputs a high level detection signal, the transistor $Q_2$ of the abnormal condition sensing unit 20 becomes conductive, thereby causing the collector thereof to output a low level signal being an abnormal condition detecting signal. For example, when a high level detection signal is outputted, the detection signal is applied via the diode $D_5$ and the resistor $R_5$ to the base of the transistor $Q_2$, thereby causing the transistor $Q_2$ to become conductive so that a low level signal is outputted from the collector of the transistor $Q_2$. As a result, the connection node $S_3$ of the condition sensing unit 10 and the microcomputer 7 becomes a low level state by the diode $D_3$, so that the microcomputer 7 recognizes that the condition is abnormal and executes a relevant operation. And, also the connection node $S_1$ of the integrator 11 and the charge/discharge unit 13 becomes a low level state by the diode $D_3$ so that the output voltage of the integrator 11 is not inputted to the charge/discharge unit 13. Thus, the voltage charged at the condenser $C_1$ of the charge/discharge unit 13 is slowly discharged through the resistor $R_1$ so that the output voltage of the operational comparator $OP_2$ is slowly reduced. Thereby, the output voltage of the operational comparator $OP_3$ is also slowly reduced so that the power transistor driving unit 19 cuts off slowly the driving of the inverter circuit 3.

On the other hand, the minimum turn-on time setting unit 15 outputs a low level signal when the output voltage of the charge/discharge unit 13 is greater than the value set by itself, thereby a low level signal is applied to the base of the transistor $Q_1$ and the transistor $Q_1$ is turned off so that the output voltage of the operational comparator $OP_2$ is applied normally to the non-inverting input port of the operational comparator $OP_3$.

However, when the voltage of the charge/discharge unit 13 is discharged to be lower than the value set by the minimum turn-on time setting unit 15, a high level signal is outputted from the minimum turn-on time setting unit 15 and the high level signal is applied via the diode $D_4$ and the resistor $R_3$ to the base of the transistor $Q_1$ to turn the transistor $Q_1$ on so that a low level signal is outputted from the collector of the transistor $Q_1$. Accordingly, since the output signal of the operational comparator $OP_2$ flows into the collector of the transistor $Q_1$ through the resistor $R_2$ at this moment, and a low level signal is applied to the non-inverting input port of the operational comparator $OP_3$ so that a low level signal is continuously outputted from the operational comparator $OP_3$, thereby the power transistor driving unit 19 cuts completely off the driving of the inverter circuit 3.

Meanwhile, the operation of the case that a high level signal is outputted from the collector voltage limiting circuit 16 or the upper plate temperature sensing unit 17 is identical to that of the case that a high level signal is outputted from the temperature sensing unit 6 as above described.

Other operation of the circuit is identical to that of the conventional circuit as described with reference to FIG. 1.

As described above in detail, the present invention provides the effects that the breakdown of the circuit components such as a power transistor is prevented by slowly cutting off the driving of the inverter circuit in case that the temperature of the heating plate and the upper plate rises excessively and that the collector voltage of the power transistor rises excessively, and also provides a further effect that the safety and reliability of an electromagnetic induction cooking apparatus since in case that such an abnormal condition is detected, the detection signal is applied to the microcomputer so that the microcomputer executes a relevant control operation.

Although, the preferred embodiment of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A surge preventing circuit for an electromagnetic induction cooking apparatus comprising:

means for sensing a temperature of a heating plate when the temperature rises excessively;

means for sensing a temperature of an upper plate when the temperature rises excessively;

a collector voltage limiting circuit for detecting a collector voltage of a power transistor of an inverter circuit when the collector voltage is greater than a rated value;

an abnormal condition detecting unit for detecting the abnormal condition when a detection signal is outputted from any one of said temperature sensing unit, said upper plate temperature sensing unit or said collector voltage limiting circuit;

a gate circuit for cutting off the input of an output voltage of an integrator to a charge/discharge unit in response to an output control signal of a microcomputer when an abnormal condition is detected by said abnormal condition detecting unit and for applying the abnormal condition detection signal to the microcomputer;

a minimum turn-on time setting unit for detecting the output voltage of the charge/discharge unit when the output voltage is lower than a set value; and a minimum turn-on time output control unit for cutting off the output voltage of the charge/discharge unit to be inputted via an operational comparator to the power transistor as a driving control voltage by the detection signal of the minimum turn-on time setting unit.

2. The circuit as claimed in claim 1, wherein the abnormal condition sensing unit is constituted such that outputs of the temperature sensing unit, the collector voltage limiting circuit, and the upper plate temperature sensing unit are connected via first, second and third diodes, respectively, to a base of a first transistor so that an abnormal condition detection signal is outputted from a collector of the transistor.

3. The circuit as claimed in claim 1 wherein the minimum turn-on time output control unit is constituted such that the output of the minimum turn-on time setting unit is connected via a fourth diode to a base of a second transistor and a collector of the transistor is connected to a non-inverting input port of a first operational comparator of which an inverting port is connected to a synchronizing circuit, and an output port of the second operational comparator.

4. The circuit as claimed in claim 2, wherein the minimum turn-on time output control unit is constituted such that the output of the minimum turn-on time setting unit is connected via a fourth diode to a base of a second transistor and a collector of the transistor is connected to a non-inverting input port of a first operational comparator of which an inverting port is connected to a synchronizing circuit, and an output port of the second operational comparator.

* * * * *